(No Model.) 2 Sheets—Sheet 1.
J. WEIES & P. GASSEN.
APPARATUS FOR PRODUCING PLASTIC ORNAMENTS ON PROFILED BORDERS, &c.
No. 452,204. Patented May 12, 1891.
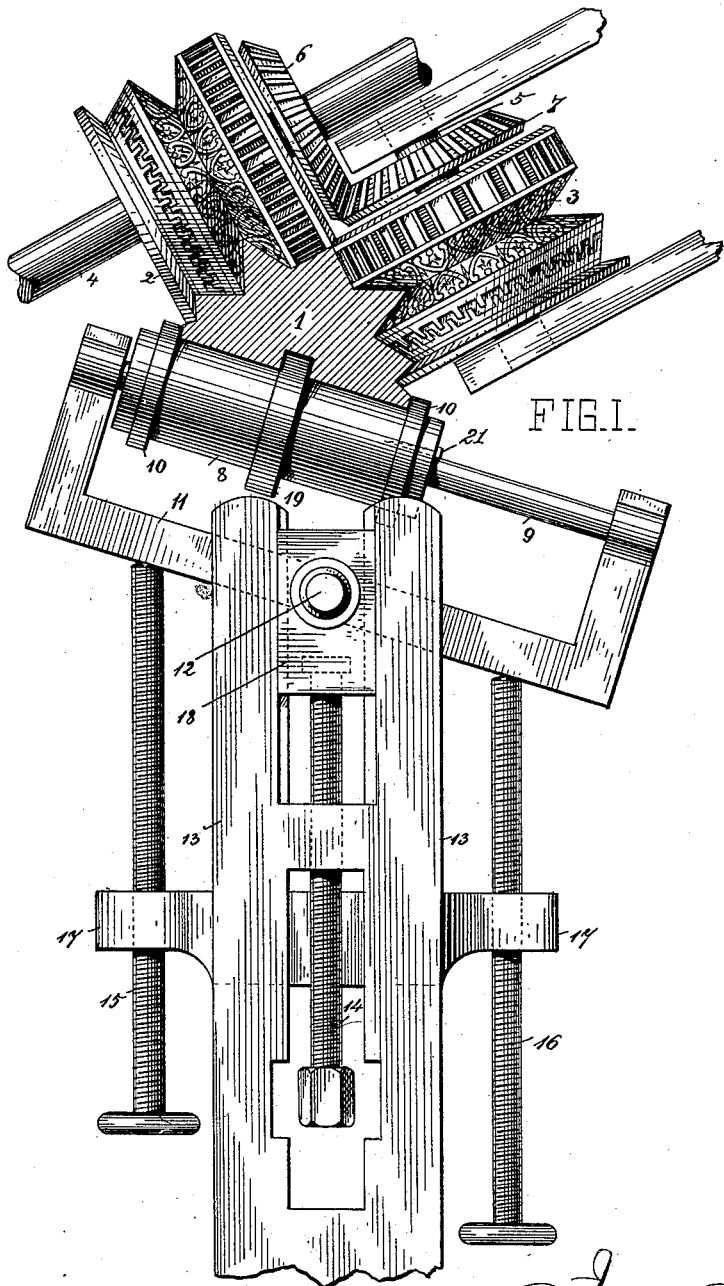
FIG. I.

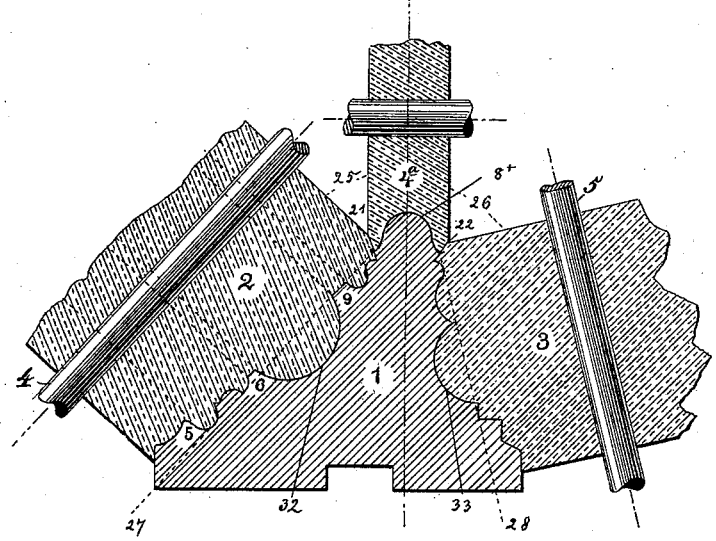
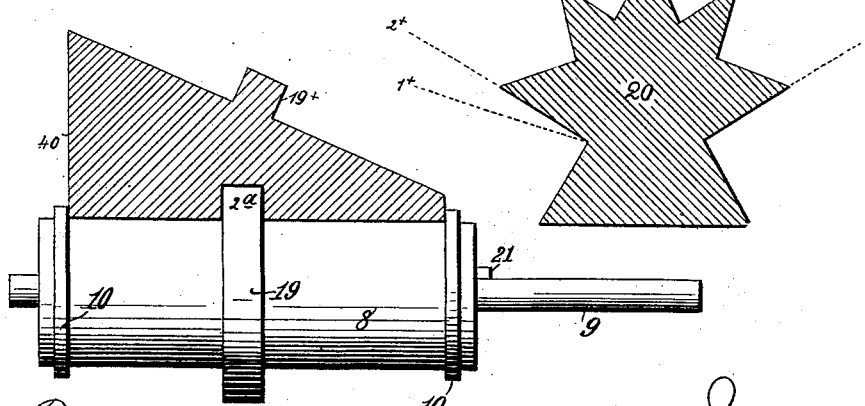

UNITED STATES PATENT OFFICE.

JEAN WEIES AND PAUL GASSEN, OF COLOGNE, GERMANY.

APPARATUS FOR PRODUCING PLASTIC ORNAMENTS ON PROFILED BORDERS, &c.

SPECIFICATION forming part of Letters Patent No. 452,204, dated May 12, 1891.

Application filed January 8, 1891. Serial No. 377,151. (No model.)

*To all whom it may concern:*

Be it known that we, JEAN WEIES and PAUL GASSEN, manufacturers, of Cologne, in the Kingdom of Prussia and German Empire, have invented new and useful Improvements in the Apparatus for Producing Plastic Ornaments on Profiled Borders, Pillars, and Plates, of which the following is a specification, reference being had therein to the accompanying drawings.

This invention has for its object to provide novel means for molding, shaping, or decorating rods, bars, columns, and plates of any material capable of being molded by pressure or upon which an outer covering or skin of plastic material is placed which can be decorated with the required ornament or design.

To accomplish this object our invention involves the features of construction, the combination or arrangement of devices, and the principles of operation hereinafter described and claimed, reference being made to the accompanying drawings, in which—

Figure 1 is a broken elevation, partly in section, of a machine embodying our invention. Fig. 2 is a detail sectional view showing a modified arrangement of molding-rollers. Fig. 3 is a detail sectional view of a molded bar or column differing in form or shape from that exhibited by Figs. 1 and 2, and Fig. 4 is a detail sectional view of a modification hereinafter described.

In order to enable those skilled in the art to make and use our invention, we will now describe the same in detail, reference being made to the drawings, wherein—

The numerals 2 and 3 indicate the molding-rollers, suitably prepared, as hereinafter explained, to shape the work or object or provide the surface thereof with decorations. The molding-rollers are mounted on rotating spindles 4 and 5, which in Fig. 1 are arranged at right angles to each other and are provided, respectively, with beveled gear-wheels 6 and 7, meshing into each other, so that the rotation of one shaft will transmit motion to the other shaft in such manner as to draw the work or object 1 between the pair of molding-rollers.

The work or object is supported by a carrying mechanism consisting of a cylinder 8, carried by and movable lengthwise upon a shaft or spindle 9, which is journaled in a rocking yoke-frame 11, pivoted centrally between its ends to an axle 12, which is carried by a vertically-movable slide-block 18, moving on suitable guides of a stationary frame 13. The slide-block can be raised and lowered through the medium of a set-screw 14, tapped through a stationary part of the frame 13 and suitably engaged with the slide-block.

The frame 13 is provided at its opposite sides with projecting arms 17, each carrying a set-screw 16, which bears at its upper end against the rocking yoke-frame, whereby the latter can be adjusted and held in any desired position for the purpose of varying the angle of inclination of the carrying-cylinder 8. The shaft or spindle 9, journaled in the rocking yoke-frame 11, is made considerably longer than the cylinder 8 for the purpose of enabling the latter to be moved along the length of the shaft or spindle to suit the conditions required. The cylinder is held in fixed relation to the shaft or spindle 9 through the medium of a key 21 or any other suitable devices. By this means the carrying-cylinder is capable of being adjusted to different positions and to different angles of inclination.

The carrying-cylinder is provided with a series of adjustable collars, one of which 19 is arranged centrally between its ends and the others 10 being arranged, respectively, at or near the extremities of the cylinder. These collars are designed to be adjusted along the length of the cylinder, which may be accomplished by any well-known devices, and therefore we do not deem it essential to more fully illustrate the same.

In some instances where particular designs are to be produced and the carrying-cylinder must assume an extreme incline position, which could not be well effected by the adjustment of the rocking yoke-frame, we provide a secondary guide-bar 40, Fig. 4, having a groove $2^a$ in its under side to receive the collar 19 of the carrying-cylinder 8. The upper surface of this guide-bar is formed with an inclined plane and a rib or projection $19^\times$ to enter a groove in the work or object 1. By this means the adjustment of the rocking yoke-frame to an inclined position will obviously place the work at a greatly-increased angle of inclination. The manner of placing the guide-bar upon the carrying-cylinder is illustrated by Fig. 4.

It is difficult to mold or shape rods, columns, or other material of a plastic nature, or to decorate a plastic skin or covering applied to a rod, bar, column, or molding, either by reason of the depth of the object or by the reason of the same being undercut. By our invention this difficulty is entirely overcome.

In practice the desired pattern is produced from sheet metal, which pattern forms a templet for the production of the molding-rollers. The work or object 1 may be formed entirely of material which can be molded into shape, or such work or object may be of any material provided with a skin or coating of plastic material, and likewise the work or object may be round, polygonal, or any shape in cross-section.

If a molding or work 1 of the form shown in Fig. 2 is desired, we employ a third roller $4^a$ to produce the rounded portion $8^x$, and so arranged that the three rollers 2 3 and $4^a$ meet at the points 21 and 22, and thus avoid the presence of burrs at such points.

In Fig. 2 the molding or work has undercut parts 32, 33, 5, 6, and 9, and the shaping-rollers 2 and 3 are formed to properly produce such undercut portions.

We have merely exhibited the relative arrangement of the work 1 and rollers 2, 3, and $4^a$ in Fig. 2; but it will be understood that these several rollers may be driven by any suitable gearing, and that the work is sustained by a rotating support carried by a rocking frame, the same as described with reference to Fig. 1.

We do not deem it essential to illustrate in Fig. 2 the gearing, the rotating support, the rocking frame, and its adjusting devices, as such figure is merely a detail view to show rollers for producing a form of design or ornamentation different from that exhibited by Fig. 1.

The positions of the molding-rollers are different if the angles of the channels to be produced are different, as will be obvious from an examination of the angles $1^x$, $2^x$, and $3^x$ of the object or work 20, Fig. 3.

The molding-rollers are suitably provided by engraving, stamping, or otherwise with the desired decorations or configurations which are to be imparted to the work or object. When the molding-rollers have been produced through the medium of a pattern which is the counterpart of the work to be produced, care must be taken that the diameters of the various parts of the roller do not widely differ and that the diameters of the several rollers at the points of contact with each other be alike for all the rollers.

In practical operation the work or object rests upon the rotating cylinder 8 and is operated upon by the molding-rollers 2 and 3, as clearly indicated in Fig. 1, where two rollers are being operated, and in Fig. 2, where three rollers are being operated. The molding-rollers are caused to turn in the same directions by the bevel-gears 6 and 7, and thus they draw the work between them and the rotating cylinder 8. Thus while the work or object is drawn between the rollers the latter firmly press the plastic material and form it into the required design, which will be a counterpart of that with which the rollers are provided.

Having thus described our invention, what we claim is—

1. The combination of a pair of angularly-arranged shafts, each carrying a decorating or molding roller, gearing for rotating the rollers, a vertically-adjustable rocking frame, a rotating work-support carried by the rocking frame, and means for adjusting the rocking frame to different inclined positions, substantially as described.

2. The combination of a pair of angularly-arranged shafts, each carrying a decorating or molding roller, a pair of intermeshing beveled gears mounted, respectively, upon the shafts for rotating the rollers, a vertically-adjustable rocking frame, a rotating work-support carried by the rocking frame, and means for adjusting the rocking frame to different angles of inclination, substantially as described.

3. The combination, with decorating or molding rollers, of a suitable frame, a vertically-adjustable slide-block on the frame, a rocking frame carried by the slide-block, a rotating work-support carried by the rocking frame, and means for adjusting the rocking frame to different angles of inclination, substantially as described.

In witness whereof we have hereunto set our hands in presence of two witnesses.

JEAN WEIES.
PAUL GASSEN.

Witnesses:
GUSTAVE OELRICHS,
REINER LÜHMANN.